United States Patent [19]
White

[11] 4,414,814
[45] * Nov. 15, 1983

[54] SOLAR HEAT ENGINES

[76] Inventor: Eugene W. White, R.D. #2, Box 182, Rossiter, Pa. 15772

[*] Notice: The portion of the term of this patent subsequent to Nov. 2, 1999 has been disclaimed.

[21] Appl. No.: 267,902

[22] Filed: May 28, 1981

Related U.S. Application Data

[63] Continuation-in-part of Ser. No. 181,790, Aug. 27, 1980, Pat. No. 4,356,697.

[51] Int. Cl.³ .................................................. F03G 7/06
[52] U.S. Cl. ........................................ 60/682; 60/516; 60/508
[58] Field of Search ................ 60/506, 512, 516, 517, 60/519, 650, 682, 641.14; 417/52, 207, 379

[56] References Cited

U.S. PATENT DOCUMENTS 3,732,040  5/1973  Low et al. ............................ 60/531
4,356,697  11/1982  White .................................... 60/682

FOREIGN PATENT DOCUMENTS 688689  11/1982  U.S.S.R. ................................ 60/682

*Primary Examiner*—Allen M. Ostrager
*Attorney, Agent, or Firm*—Buell, Blenko, Ziesenheim & Beck

[57] ABSTRACT

A new solar heat engine is provided in the form of a pressure oscillation generation device having a chamber with two spaced apart walls, means on one wall receiving sunlight through said one wall, means on the other of said walls continuously cooling said other wall, a light absorbing surface on a thermal shield movable between said walls, means for automatically alternating said sunlight absorbing surfaced thermal shield back and forth between said walls whereby a heat expansible fluid contained in said chamber is alternately heated and cooled thereby causing said fluid to undergo alternate expansions and contractions. The alternate expansions and contractions of the fluid are used to produce useful work by pump action, torque action, compression and the like.

11 Claims, 7 Drawing Figures

SOLAR HEAT ENGINES

This application is a continuation-in-part of my copending application, Ser. No. 181,790, filed Aug. 27, 1980, now U.S. Pat. No. 4,356,697 and includes the substance of my earlier Disclosure Documents 078388 and 089739.

This invention relates to solar heat engines and particularly to an apparatus that converts solar heat energy into an oscillating gas pressure that is in turn converted into useful pneumatic, hydraulic, mechanical or electrical energy.

For centuries, man has sought ways to directly harness the sun's energy to do work and make this dwellings more confortable. In the course of everyday living, one would like to have the sun's free energy provide the heating, cooling, lighting, refrigeration and mechanical power needs of homes, schools and factories. To be implimented, costs of this solar energy system and its maintenance should be cost competitive with established fuel consuming systems.

No one disputes that solar energy could, at least theoretically, do the job. In bright sunlight the energy falling on one square foot of the earth's surface at 40° latitude is on the order of 300 BTU/hr. Thus on a 600 sq. ft. area which is only about one half the roof area of a typical small dwelling, one receives some 180,000 BTU/hr. Overcast skies cut this intensity by about 80% or to some 36,000 BTU/hr.

Some conversions of the 180,000 BTU/hr. that help put this value in perspective include rough energy equivalents as follows:

(1) 1.2 gal. of gasoline or fuel oil per hour.
(2) 21 pounds of oven dry wood per hour.
(3) 180 cubic feet of natural gas per hour.
(4) 70 horse power for one hour at 100% conversion efficiency.
(5) 52.7 kilowatt hours of electrical current at 100% conversion efficiency.

The root problem is not to point out the staggering magnitude of this energy resource but to arrive at ways to cheaply capture it and use it to perform the tasks outlined above.

Passive solar heating is becoming more widely understood and is being used successfully to provide the bulk of the heating requirements of a few newly constructed buildings. While it will play an increasing role as architects and builders become confident in the technologies involved, it is not a viable retrofit approach to most existing structures and does not directly solve the non-heating energy requirements.

The so-called active approaches to solar heating and cooling, while they are coming into more common usage, invariably consume electrical energy to run motors that circulate the forced air or liquid heat-carrying fluids. Unfortunately, air or liquids heated at roof level do not automatically circulate to the lower levels where needed. Therefore energy must be consumed in forcing the circulation. Since temperature differences are quite small (only a few 10's of degrees) large volumes of fluid must be moved to be effective. Thus in addition to simply heating air or liquids the sun's energy should also be harnessed to do the mechanical job of distributing the heated medium to where the heat is used or stored.

The most common approaches to obtaining mechanical or electrical energy from direct sunlight are by means of the Rankine cycle thermodynamic machines (steam engines, for example) or photovoltaics. Various fluids, in addition to water, are used to have solar energy produce a pressurized vapor to drive an engine or turbine thereby obtaining horsepower from a rotating shaft.

Steam engines are relatively inefficient, operating at only about 10% thermal efficiency. Thus for every horsepower produced one can expect to use some 25,600 BTU of heat energy. This situation is alleviated somewhat whenever one can cogenerate or in other words, use the waste heat from the steam engines for space heating, etc.

Photo cells are made from a variety of materials invariably involving quite high technology and due to the cost of material and manufacturing techniques they are presently too expensive for use on a scale that would supply a home's electrical needs. Also, photovoltaic devices are only about 10% efficient.

Both approaches are being vigorously pursued and many proposals have been made to use large steam producing heliostats and solar cell arrays to produce commercial utility power.

Solar energy is of course a distributed form of energy. As such, it ideally should be collected at the point of use and not have to be transmitted over long distances.

If one examines all the known kinds of heat engines that could possibly be adapted to use sunlight directly, one has to be intrigued by the stirling cycle engines. Under ideal conditions, the stirling cycle is thermodynamically the most efficient with demonstrated performance up to 50% thermal efficiency. In the stirling, air or other gaseous medium is continually moved from a continuously heated space to a continuously cooled space by means of a movable volume displacer which alternately occupies the space in the heated region of the engine, then the cooled space thereby causing the working gas to "slosh" back and forth, alternately heating and cooling, hence the engine's internal pressure increases and decreases. The main concept that Mr. Stirling introduced was to have the gas pass back and forth through a heat recuperator while being forced back and forth between the heated and cooled regions. Thus when being forced to the cool end of the engine, heated gas would warm up the material in the recuperator. When returning from the cool end heat would be picked up in the way through the recuperator. This recuperator action reuses some of the heat energy in a way that conventional internal combustion engines cannot do.

Having studied the various possibilities, I have discovered a sun-powered engine that is related to the stirling cycle but which can be built of relatively inexpensive materials. By using non-focusing flat plate kinds of construction, conventional solar panel material, and mechanical components could be used with a minimum of new component design.

Although a wide variety of specific configurations and uses are envisioned, the invention basically takes two forms. The first is a device that functions as a simple air pump. The second is a true engine in that the output is mechanical torque energy on a rotating shaft. This engine operates with a thermal efficiency on the order of 30%. Thus on our 600 square foot its output is on the order of 15 horsepower. Both of these devices can be built of readily available materials using generally available tools and components.

The concept of the invention is to use a movable sunlight absorber attached to an insulating substrate.

The absorber becomes in effect the source of heat within the engine. It absorbs sunlight that the window transmits. The process of absorption converts the solar energy to longer wavelength infrared energy that now sees the window as opaque—hence the greenhouse effect. The window can be of standard flat plate collector construction, generally double glazed tempered glass, or plexiglass, for example. The back surface of the engine however is a metallic conductor providing the heat sink for the engine.

As in the stirling engine, the object of the invention is to produce vascillations in the temperature of the enclosed gas, thereby generating pressure oscillations or expansion and contraction cycles in the gas. Whenever the solar absorbing surface is adjacent to the window, the bulk of the air is in shadow and because the underside of the hot absorber is insulated, the dominant thermal effect is heat loss to the conducting base, hence cooling, and pressure drop in the gas. Note that the absorber is always receiving sunlight even when in the position adjacent to the window.

When the insulator-backed sunlight absorbing surface is lowered so that the insulating back is adjacent to the heat conducting metal back plate, the bulk of the air is above the absorber and exposed to its hot surface and any warmth contained in the inside layer of the window. Thus with the absorber in the down position the gas is warmed, hence pressure in the chamber rises due to expansion of the confined heated gas. Note that the absorber continues to collect sunlight and the metal back continuously losses heat to the environment.

If the temperature of the gas oscillates between say 80° F. and 130° F. then the pressure will oscillate by about 1.5 pounds per square inch.

By providing simple check-valves on inlet and outlet ports to the device one has an air pump which moves air through the chamber drawing in cool air and expelling warmed air optionally used in conjunction with other solar hot air heating panels. This device can suck cool air from a building and return warmed air. This is in effect a cogenerating device in the sense that thermal energy used to pump air by action of the oscillation thermal fluctuations also makes use of some of the heat for space heating.

It must be noted that the insulator-backed absorber does essentially no work in its movement toward and away from the window as its merely relocates the source of heat within the panel. Thus the absorber can be moved by a relatively small solar cell-powered, gear reduced, D.C. motor. A cam on the motor output shaft actuates a connecting push rod to raise and lower the absorber assembly. Turbulence of the fluid induced by passing from one side to the other of the absorber aids in the rate of heat transfer as the absorber moves from one position to another.

One of the alternative ways to actuate the absorber assembly is to place an air turbine in the outlet air line and take power from the turbine's shaft to drive the cam. In this way the alternations will be automatically made at the optimum cycle frequency. To have the turbine run smoothly, one would either use ballast storage of the pressurized air or use two or more units with phased timing of the mechanisms.

As a second embodiment of this invention I have extended the basic concept of vascillating an insulator-backed absorber between the inside window and the cool bottom surface of a modified flat plate solar collector and devise a true heat engine. This is done in the following way. First, nominally sealed panels are used. A minimum of three adjacent identical panels is suggested but virtually any number can be used. Tie rods are generally required to restrain the window and bottom from bulging or breaking. Pressure oscillations in individual panels are transduced by means of extensible bellows fastened over a hole in the bottom metal plate. A rod attached to the closed end of the bellows connects to a crank shaft. Successive in-line panels have phased crank shaft positions to "time" the cyclic vascillations of the respective absorbers. Obviously, the higher number of such panels are used the lighter the weight the fly wheel could be. Cams directly on the crank shaft actuate the motion of the insulation-backed absorber sheets. Instead of bellows, large diameter ring-sealed hollow pistons, could accomplish the same result but with some penalty for increased frictional resistance.

The invention disclosed in application Ser. No. 181,790 of which this is a continuation-in-part relates to an apparatus in the form of a chamber wherein one wall is continuously heated on the outside by a steady heat source, one wall is continuously cooled on the outside, and inside the chamber thermal shield is made to alternate between the hot and cool inner surfaces such that pressure of the contained gas increases and decreases in response to the alternate heating and cooling of the contained gas.

It is an important object of the invention there disclosed to provide an apparatus and process constituting an external heat source engine that has as its basic feature a chamber containing at least one externally heated and one externally cooled wall and inside which a thermal shield is caused to alternate between the corresponding two surfaces to subject the contained gas to fluctuations in temperature thereby causing the pressure of the gas to also fluctuate (oscillate).

It is an important object of this present invention to use sunlight as the external heat source in an apparatus and process such as that disclosed in application Ser. No. 181,790, with certain modifications to adapt it to solar power.

It is also an object of this invention to provide an apparatus that can be quite simply understood and maintained by most users and that is manufactured to generous tolerances by simple tooling.

It is another object of this invention to have the apparatus function as an air pump by providing an inlet and an outlet port to the chamber. The inlet port opening to ambient air is check-valved to prevent pressurized air from leaving a chamber but allows air to enter the chamber when its internal pressure is less than atmospheric. The outlet port is connected to a ballast or storage tank and is check-valved to permit compressed air to pass when the chamber pressure exceeds that of the storage or ballast tank.

It is also an objective of the invention to use the compressed air from the ballast or storage tank to drive any kind of air motor or turbine device for the purpose of generating electrical power or to power any available air driven tool or machine.

It is also an object of the invention to use more than one compression stage wherein the output from one device becomes the input to another device thus multiplying pressure of the compressed air.

It is also an objective of the invention to pressurize the chamber so that the apparatus will generate substantial pressure differentials for the purpose of driving power stroke pistons.

It is also an objective of the invention to pressurize the chamber and have the cold wall constructed of a flexible material such that it will flex in response to the internal pressure oscillations thereby transmitting the oscillating pressure to an externally clamped piezoelectric device for the purpose of directly generating an alternating electrical current or voltage.

It is also an objective to utilize working gases other than air.

It is also an objective of this invention to optionally focus sunlight onto the window.

It is also an object of the invention to remove heat from the cooled surface by means of ambient air, circulated water, refrigerant or other means.

It is also an object of the invention to construct the pressure oscillation generator apparatus in a wide variety of shapes and sizes.

Finally it is an object of the invention to have the thermal shield function as a heat exchanger or recuperator to increase the thermal efficiency of the device.

These and other important objects and advantages of my invention will be apparent from the following description taken in connection with the accompanying drawings in which.

Figure 1:
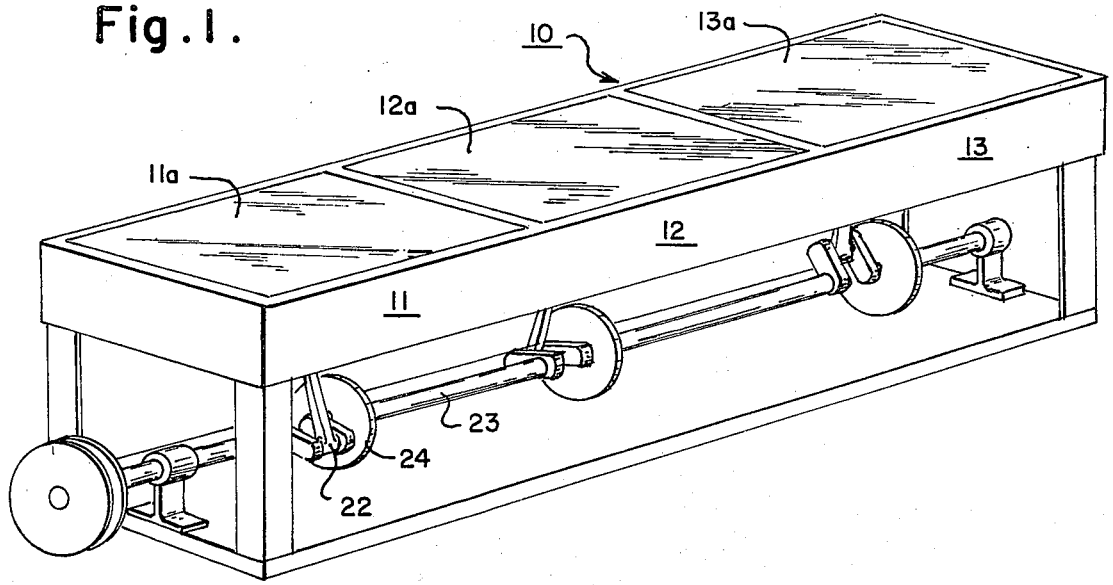
FIG. 1 is an isometric schematic view of a solar engine according to this invention.
Figure 2:
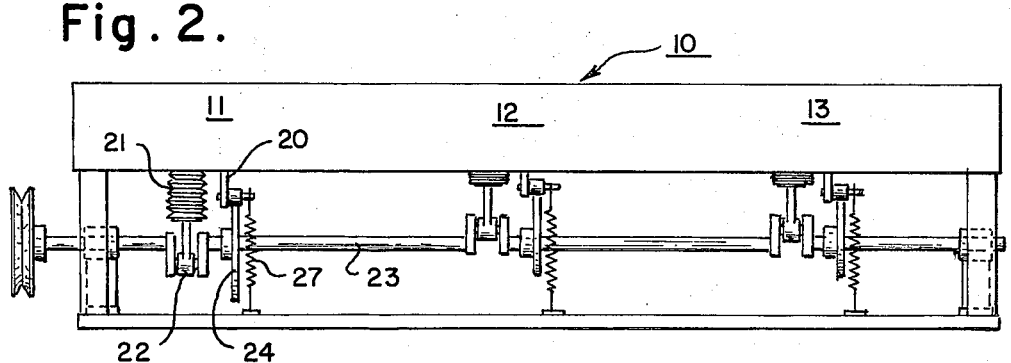
FIG. 2 is a side elevational view of the apparatus of FIG. 1.
Figure 3:
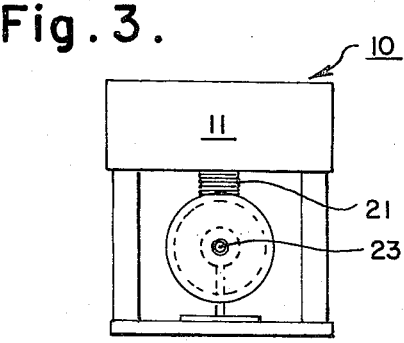
FIG. 3 is an end elevational view of the apparatus of FIG. 1.
Figure 4:
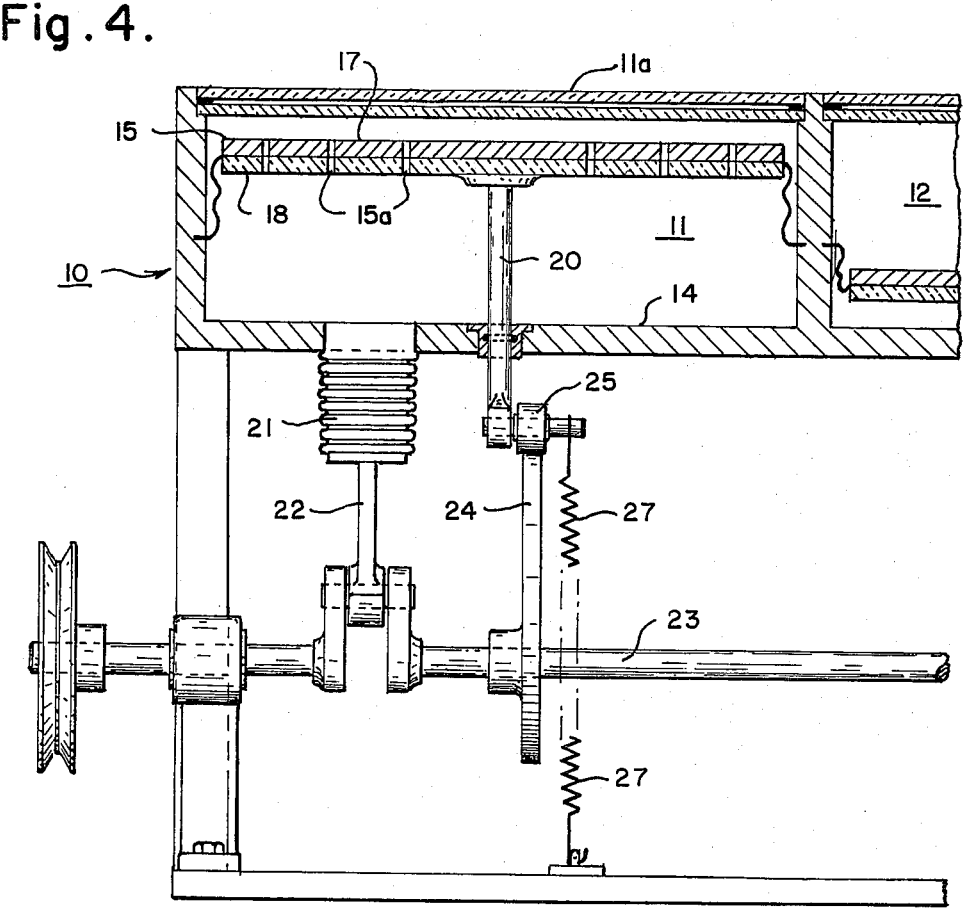
FIG. 4 is an enlarged fragmentary sectional view showing the crank and cam arrangement.

Referring to the drawings and particularly to FIGS. 1 and 2, I have illustrated a solar engine 10 which consists of three adjacent closed chambers 11, 12 and 13, each having vertically movable solar panels 15 that are caused to move back and forth between double glazed plexiglass windows 11a, 12a and 13a and a cooled wall 14. Each solar panel 15 is externally actuated by means of a lever arm 20. Such activation can be accomplished in several ways including an electrical solenoid, an air piston, a revolving cam, etc., operated from the solar energy. Heat energy impinges on the solar panel faces which are heat absorbing thus causing the inside of the wall to also become heated by means of conduction. The glazed windows are exposed to the sun and each solar panel 15 is provided with a heat absorbing surface 17 backed by an insulator member 18. Wall 14 is preferably cooled on the outside surface to remove heat energy from the chamber 11. In the preferred mode, cooling is accomplished by circulated room air either by simple convection air currents or by forced air circulation thereby using a living space as the heat sink. When the solar panels are remote from the windows 11a, 12a and 13a they absorb the heat from the sun's rays and the gases in the chamber are expanded into bellows 21 which push the attached connecting rods 22 downwardly which in turn causes the crankshaft 23 to rotate. Rotation of the crankshaft 23 causes the rotation of cams 24 which in turn engage cam rollers 25 on lifter arms 20 which are fixed to the solar panels 15 causing them to be raised to a position adjacent the windows. The gases pass through holes 15a in the solar panels 15 as they are raised and are promptly cooled causing the bellows to contract and the camshaft to rotate. The springs 27 on lifter arms 20 thereupon draw the solar panels 15 back to the bottom of chambers 11, 12 and 13 and the cycle is repeated. No timing belts or separate cam shaft is needed, thus an apparatus of extreme simplication is provided. In a 4 ft.×6 ft. unit as described above there is developed about one-half horsepower in bright sunlight. This can be utilized to pump water, gases, etc., which have been absorbing heat so as to provide a complete solar system. This source of power can of course be utilized in a variety of other ways.

Figure 5:
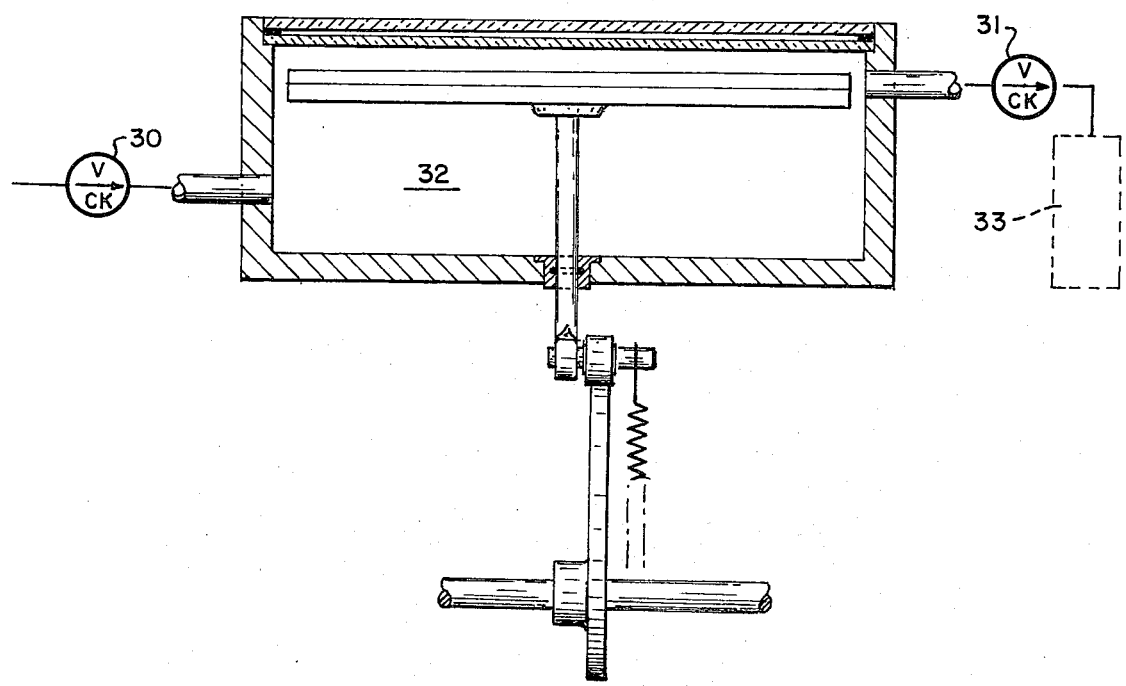
FIG. 5 is a sectional view of the apparatus of this invention used as an air compressor.

FIG. 5 illustrates a preferred embodiment of the invention as an air compressor. The pressure oscillation generating device is equipped with a check-valved inlet port 30 and a check-valved outlet port 31. Air passes check valve 30 into chamber during cooling part of cycle when pressure in chamber is below atmospheric. During the heating part of cycle, when pressure in chamber 32 exceeds that of a ballast tank or the work member, exhaust check valve 31 opens to allow air to exit chamber 32. In this preferred mode, an air motor or other operator is driven by the pressurized air leaving through check valve 31. The air motor can be used to power an electrical generator or any other useful device. Depending on the nature of the heat source, pressures in ballast tank 33 may not be large enough for available air motors. Thus a second stage may be added by simply having the inlet port 30 connect to a first stage pressure device and using an air motor on the second stage output only.

Figure 6:
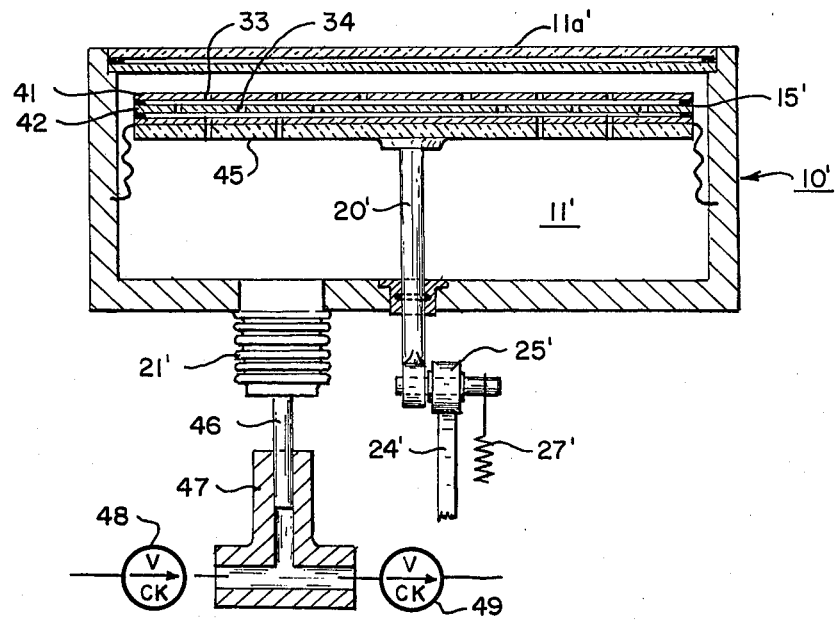
FIG. 6 is a longitudinal sectional view of a solar engine according to a second embodiment of this invention used to drive a piston pump.

A second embodiment of this invention uses the pressure oscillation generator device to power a piston as shown schematically in FIG. 6. In this device like parts are given like numbers to those in FIG. 1 with a prime sign. In this embodiment, the pressure oscillation generator 11' communicates its pressure oscillations to one end of a power piston to operate it in a push-pull mode through a bellows 21'. In this embodiment the thermal shield 15' is made up of a plurality of spaced absorption sheets 41 and 42 with non-aligned openings 33 and 34 fixed to a perforated insulator plate 45. The ends of plate 45 are nominally sealed to the end walls of the housing 10'. These perforations permit the expanded gas to pass through rather than around the thermal shield 15' as it is alternately moved from one position to the other. As the gases are alternately heated to expand and cooled to contract the bellows 21' expands lengthwise moving the piston 46 back and forth, generally as in FIGS. 1–4. This figure illustrates the use of the pressure oscillation generator device to pump a fluid. Here the piston 46 is reciprocated in a cylindrical barrel 47 having check-valved inlet 48 and outlet 49 ports.

A closely related application of this device would be to have it pump virtually any kind of gas from a source to its destination.

Figure 7:
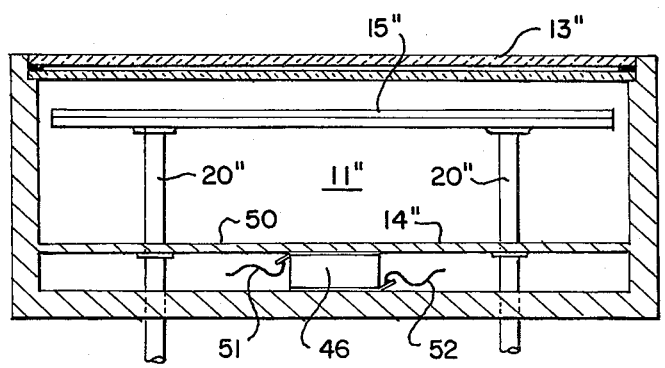
FIG. 7 is a schematic view of a pressure oscillation generator according to this invention used for direct production of alternating electrical current using a clamped-on piezoelectric.

Another embodiment of this invention is to use the pressure oscillation generator device to drive a directly coupled piezoelectric device for the purpose of generating alternating electrical current or voltage. FIG. 7 illustrates this configuration wherein a mechanically rigid yoke 50 is attached to the chamber 11". Sandwiched between the cold wall and the yoke is a piezoelectric 46 such as PZT. Electrical leads 51 and 52 attach to the electroded surfaces of the piezoelectric. The cold wall 14" is constructed of a less rigid material than the window wall 13" and other parts of the chamber 11". The chamber is pressurized to some baseline operating pressure introducing pressure through 24 - say 1500 psi. As the thermal shield is oscillated in the chamber, pressure oscillations will be transmitted to the piezoelectric by flexures of the cold wall 14".

One of the most interesting applications of the pressure oscillation generator of this invention is as a means to convert low grade (small ΔT's) thermal sources into practical power generation. As a rule, the lower the ΔT the smaller will be the Δp's generated thus structural strength requirements are relaxed and the apparatus can be built to large scale with inexpensive materials. The preferred embodiment of this concept is to build the pressure oscillation generator in the form of a large flat plate solar collector used to pump high volumes of air at modest pressure (0.1 to 2 psi). Such a device will be useful for circulating air through other flat plate collectors and buildings. Also, low pressure air turbines can generate useful electrical energy cheaply.

In the foregoing specification I have set out certain preferred practices and embodiments of this invention, however, it will be understood that this invention may be otherwise embodied within the scope of the following claims.

I claim:

1. A solar pressure oscillation generation device comprising a chamber having two spaced apart walls, means on one wall transmitting sunlight to provide heat at internal absorbing surface within the chamber, means on the other of said walls continuously cooling said other wall, a heat absorbing solar panel movable between said walls, means alternating said solar panel, back and forth between said walls whereby a gas contained in said chamber is alternately heated and cooled thereby causing said gas to undergo alternate expansion and contraction.

2. An apparatus as claimed in claim 1 having a check-valve inlet port and a check-valve outlet port communicating with said chamber whereby gas is drawn into the chamber during the cooling of the gas in said chamber and discharged under pressure during the heating of the gas in said chamber to provide a source of compressed gas under pressure.

3. The apparatus as claimed in claim 1 or 2 wherein a gas turbine is connected to said chamber and supplied with pressurized gas therefrom to drive said turbine, and an electric generator connected to said turbine and driven thereby.

4. An apparatus as claimed in claim 3 having an accumulator between said chamber and said turbine.

5. An apparatus as claimed in claim 1 wherein a bellows communicates at one end with said chamber to be opened and closed thereby, one of a piston and connecting rod at the opposite end of said bellows and movable thereby.

6. An apparatus as claimed in claim 5 wherein a piston movable on said bellows reciprocates in one end of a cylinder, and said cylinder is provided at the said other end with a fluid inlet port and a fluid outlet port, check-valve means in each of sand fluid inlet and fluid outlet ports, said inlet port being connected to a source of fluid whereby said fluid is alternately drawn into said chamber and discharged from said chamber under pressure.

7. An apparatus as claimed in claim 5 wherein a connecting rod is connected at one end to said bellows and at the opposite end to a crankshaft and crank means connecting said crankshaft to said solar panel for moving the same in timed relation to said crankshaft.

8. An apparatus as claimed in claim 1 having a check valve inlet port and a check-valve outlet port communicating with said chamber, said check-valve inlet port being connected to an adjacent vessel to be evacuated whereby fluid is drawn from said adjacent vessel through the inlet port during cooling of fluid in the chamber and discharged to atmosphere through the outlet port during the heating of fluid in the chamber.

9. An apparatus as claimed in claim 1 wherein the chamber is filled with gas under pressure and the cooled wall is flexible, a piezoelectric device fixed to said cooled wall such the pressure oscillations in the chamber are transmitted through the flexible wall to said piezoelectric device causing alternating electric current to be generated.

10. An apparatus as claimed in claim 1 in the form of a flat plate solar collector wherein the one wall is transparent and directed toward the sun and the face of the thermal shield toward said one wall is a black heat absorbing surface.

11. An apparatus as claimed in claim 1 in which the absorbing surface and thermal shield assembly functions as a recuperator exchanging heat as the gas passes through heat exchange network within the assembly.

* * * * *

UNITED STATES PATENT AND TRADEMARK OFFICE
CERTIFICATE OF CORRECTION

PATENT NO. : 4,414,814
DATED : November 15, 1983
INVENTOR(S) : Eugene W. White

It is certified that error appears in the above-identified patent and that said Letters Patent is hereby corrected as shown below:

Claim 6, column 8, line 17, "sand" should be --said--.

Signed and Sealed this

Twelfth Day of June 1984

[SEAL]

Attest:

GERALD J. MOSSINGHOFF

Attesting Officer

Commissioner of Patents and Trademarks